United States Patent
Kim et al.

(10) Patent No.: US 10,183,594 B2
(45) Date of Patent: Jan. 22, 2019

(54) RECLINER FOR VEHICLE SEAT

(71) Applicants: Jae Ho Kim, Ulsan (KR); Seong Chul Kim, Ulsan (KR)

(72) Inventors: Jae Ho Kim, Ulsan (KR); Seong Chul Kim, Ulsan (KR)

(73) Assignee: DAS CO., LTD. (KR)

( * ) Notice: Subject to any disclaimer, the term of this patent is extended or adjusted under 35 U.S.C. 154(b) by 0 days.

(21) Appl. No.: 15/474,500

(22) Filed: Mar. 30, 2017

(65) Prior Publication Data

US 2017/0327009 A1 Nov. 16, 2017

(30) Foreign Application Priority Data

May 16, 2016 (KR) .................. 10-2016-0059436

(51) Int. Cl.
*B60N 2/225* (2006.01)
*B60N 2/235* (2006.01)
*B60N 2/22* (2006.01)

(52) U.S. Cl.
CPC ......... *B60N 2/2252* (2013.01); *B60N 2/2213* (2013.01); *B60N 2/2254* (2013.01); *B60N 2/2356* (2013.01)

(58) Field of Classification Search
CPC ............................. B60N 2/2356; B60N 2/2213
See application file for complete search history.

(56) References Cited

U.S. PATENT DOCUMENTS

| | | | | |
|---|---|---|---|---|
| 7,086,699 B1* | 8/2006 | Addison | ............. | B60N 2/2252 |
| | | | | 297/362 |
| 8,905,480 B2* | 12/2014 | Stilleke | ............... | B60N 2/2252 |
| | | | | 297/362 |
| 9,475,409 B2* | 10/2016 | Jiang | .................... | B60N 2/2213 |
| 2010/0201174 A1* | 8/2010 | Ito | ....................... | B60N 2/0232 |
| | | | | 297/362 |
| 2015/0091354 A1* | 4/2015 | Enokijima | ............... | B60N 2/20 |
| | | | | 297/354.12 |
| 2015/0258918 A1* | 9/2015 | Chang | .................. | B60N 2/2252 |
| | | | | 297/362.12 |

FOREIGN PATENT DOCUMENTS

| | | |
|---|---|---|
| CN | 1124606 A | 6/1996 |
| CN | 104302508 A | 1/2015 |
| CN | 105383336 A | 3/2016 |
| JP | 2011079390 A | 4/2011 |

(Continued)

OTHER PUBLICATIONS

Korean Office Action or Application No. 9-5-2017-025376793 dated Apr. 10, 2017.

(Continued)

*Primary Examiner* — Timothy J Brindley
(74) *Attorney, Agent, or Firm* — Tarolli, Sundheim, Covell & Tummino LLP (57) ABSTRACT

Disclosed herein is a recliner for a vehicle seat, wherein a plurality of second latching protrusions (51a) is formed on a socket (50) and a plurality of first latching protrusions (41b and 42b), which is latched to the second latching protrusions (51a) when the socket rotates, is formed on two wedges (41 and 42). When the recliner is operated, a loss angle is reduced by simultaneous rotation of the wedges (41 and 42) so that the responsiveness of the recliner is improved.

6 Claims, 5 Drawing Sheets

(56) References Cited

FOREIGN PATENT DOCUMENTS

| | | |
|---|---|---|
| JP | 2015146874 A | 8/2018 |
| KR | 10-2004-0091220 A | 10/2004 |
| KR | 10-2014-0069597 A | 6/2014 |
| KR | 20150003101 A | 1/2015 |
| KR | 10-1613449 B1 | 4/2016 |

OTHER PUBLICATIONS

Chinese Office Action for corresponding Chinese Application No. 2017101567018, dated Nov. 7, 2018.

* cited by examiner

RECLINER FOR VEHICLE SEAT

BACKGROUND OF THE INVENTION

Field of the Invention

Exemplary embodiments of the present invention relate to a recliner for a vehicle seat, and more particularly, to a recliner for a vehicle seat which is capable of having a simple structure and improved operational responsiveness.

Description of the Related Art

In general, a variety of convenient devices are provided in a driver seat, a passenger seat, and seats for other passengers, which are installed in the front and rear of a vehicle interior, for comfortableness of occupants.

The convenient devices have a sliding function of adjusting a seat by pushing or pulling a seat cushion in a forward or backward direction and a reclining function of adjusting the inclination of a seat back corresponding to a backrest, according to the body type of an occupant, and a height adjustment function of adjusting the height of the seat cushion so as to be suitable for the body size of an occupant.

This reclining function is typically implemented by a recliner that is mounted to the junction of the seat cushion and the seat back.

The recliner is operated in such a manner that when the shaft (drive shaft) of the recliner is rotated by a lever or a motor, a rotational force is transmitted to a socket connected to the shaft, and internal and external gears rotate relative to each other by the rotational force of the socket so that a change of position occurs in the engagement section of the gears. The angle of the seat back is adjusted by an amount of rotation corresponding to the change of position in the engagement section.

The relative rotation between the internal and external gears is suppressed (by wedging action) by a pair of wedges provided therebetween even though an external force is applied to the seat back in a state in which the angle of the seat back has been adjusted, thereby enabling the seat back to be maintained in a fixed state.

Korean Patent Application Publication No. 10-2015-0003101 discloses an example of the conventional recliner having the above configuration.

Figure 1:
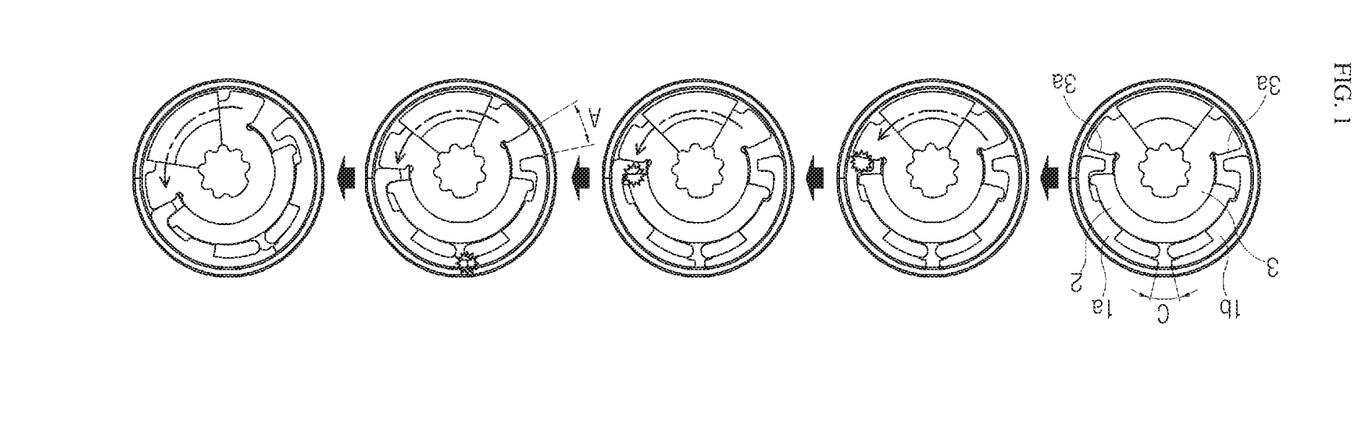
FIG. 1 is a view illustrating an inner configuration and an operation sequence of a conventional recliner.

As illustrated in FIG. 1, the conventional recliner having the above configuration includes a cam sleeve 2 that supports the inner peripheral surfaces of wedges 1, thereby causing an increase in the number of parts.

In addition, a gap c is between two wedges 1a and 1b. Accordingly, when a socket 3 rotates in one direction (e.g. in a counterclockwise direction illustrated in FIG. 1) when the recliner is operated (when the angle of the seat back is adjusted), the wedge 1a is first pushed and moved by the gap c to come into contact with another wedge 1b, and then pushes and moves the wedge 1b.

That is, a clearance A is between the socket 3 and the wedges 1, wherein the clearance A is the sum of gaps between both operating ends 3a of the socket 3 and the respective wedges 1a and 1b adjacent thereto and the gap c between the wedges 1a and 1b, in which case the operational responsiveness of the recliner is lowered due to excess of the clearance (loss angle).

In addition, the conventional socket 3 is manufactured by die casting zinc to be heavy, resulting in an increase in the weight of the recliner.

SUMMARY OF THE INVENTION

An object of the present invention is to provide a recliner for a vehicle seat which is capable of having a simple structure by a reduction in the number of parts, of having improved operational responsiveness by a reduction in the loss angle between a socket and a wedge, and of having a reduced total weight by a reduction in the weight of the socket.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a recliner for a vehicle seat includes an external gear having gear teeth formed on an inner peripheral surface thereof, an internal gear having gear teeth formed on an outer peripheral surface thereof, the internal gear being engaged with the external gear, an eccentric space defined by the internal gear and the external gear, a bush inserted into the eccentric space, a pair of wedges inserted into the eccentric space, a spring configured to push the pair of wedges in a direction in which the pair of wedges move apart from each other, a socket rotatably connected to a drive shaft to adjust an angle of a seat back by moving one of the wedges in a direction of rotation of the socket, a plate cover configured to prevent axial separation of the wedges, the spring and the socket, and a guide ring configured to prevent axial separation of the internal gear from the external gear, wherein the wedges have a plurality of first latching protrusions formed thereon, and the socket has a plurality of second latching protrusions latched to the first latching protrusions to rotate the wedges when the socket rotates.

A distance between one operating end of the socket and an end of an associated one of the wedges pushed by the operating end when the socket rotates may be equal to a distance between each of the second latching protrusions of the socket and a corresponding one of the first latching protrusions of the wedges pushed by the second latching protrusion in the same direction of rotation.

The socket may have a protruding portion inserted between the pair of wedges, and the second latching protrusions of the socket may come into contact with the first latching protrusions of the wedges when the socket rotates while the protruding portion comes into contact with an end of an associated one of the wedges in the same direction of rotation to push the associated wedge.

The external gear may have a central boss protruding from its center, the bush may be fitted to an inner peripheral surface of the internal gear, the pair of wedges may perform wedging action in such a manner that an outer peripheral surface thereof is in contact with the bush and an inner peripheral surface thereof is in direct contact with the central boss of the external gear.

The socket may be made of a plastic material.

The plate cover may be welded to an inner peripheral surface of the internal gear by laser.

The guide ring may be welded to a side of the external gear by laser.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

The present invention may be embodied in different forms and should not be construed as limited to the embodiments set forth herein. The specific exemplary embodiments of the present invention will be described herein in detail with reference to the accompanying drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the accompanying drawings of the present invention. In the drawings, the thickness of each line or the size of each component may have been exaggerated, omitted, or schematically illustrated for convenience of description and clarity.

In addition, the terms used in the specification are terms defined in consideration of functions of the present invention, and these terms may vary with the intention or practice of a user or an operator. Therefore, these terms should be defined based on the entire content disclosed herein. Meanwhile, the following embodiments are for the purpose of describing the components set forth in the appended claims only and are not intended to limit the spirit and scope of the invention.

Hereinafter, exemplary embodiments of the present invention will be described in detail with reference to the accompanying drawings.

Figure 2:
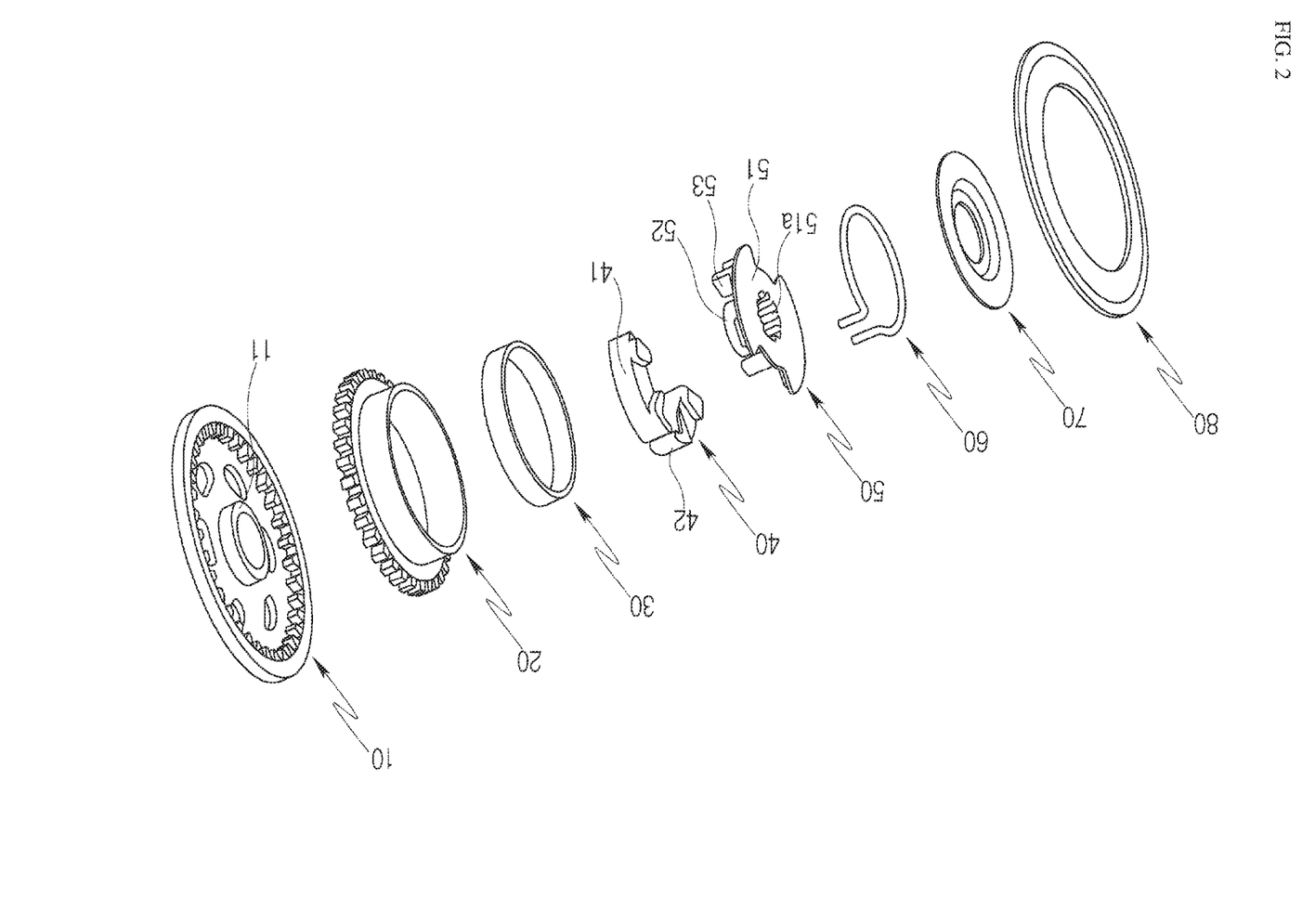
FIG. 2 is an exploded perspective view illustrating a configuration of a recliner according to an embodiment of the present invention.
Figure 3:
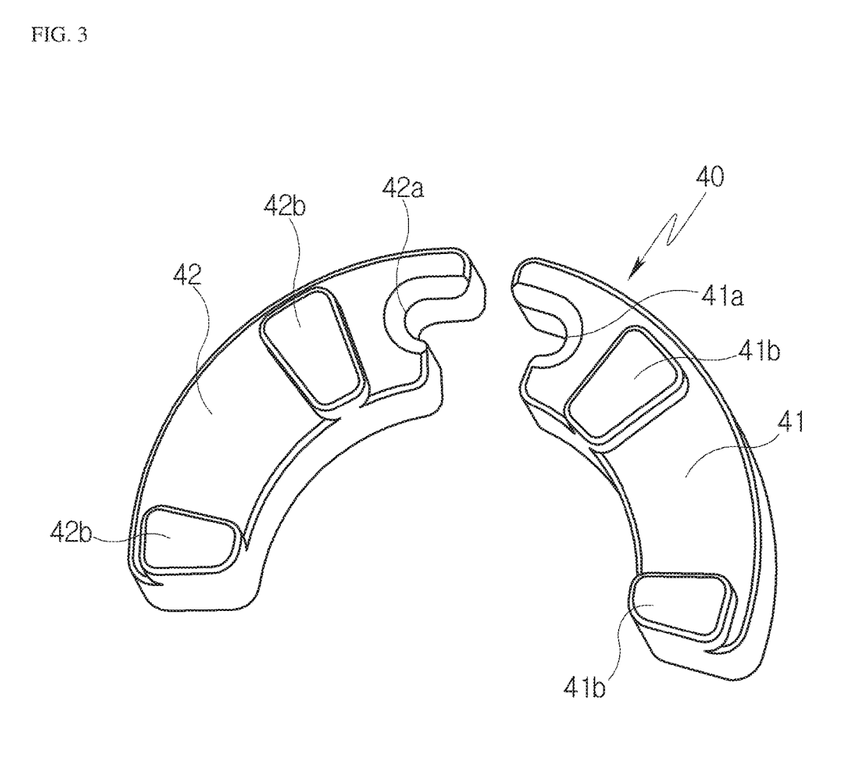
FIG. 3 is a perspective view illustrating wedges as one component of the recliner according to the embodiment of the present invention.
Figure 4:
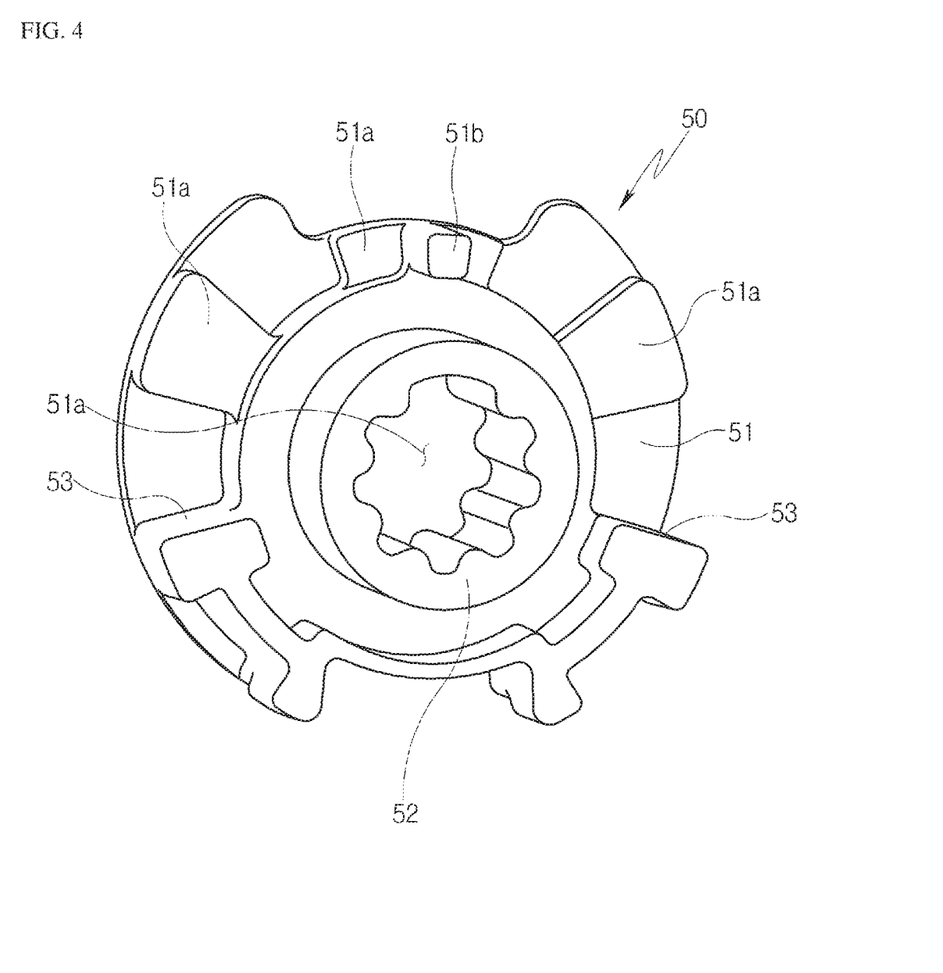
FIG. 4 is a perspective view illustrating a socket as one component of the recliner according to the embodiment of the present invention.

FIG. 2 is an exploded perspective view illustrating a configuration of a recliner according to an embodiment of the present invention. FIG. 3 is a perspective view illustrating wedges as one component of the recliner according to the embodiment of the present invention. FIG. 4 is a perspective view illustrating a socket as one component of the recliner according to the embodiment of the present invention.

As illustrated in FIGS. 2 to 4, the recliner according to the embodiment of the present invention includes an external gear 10, an internal gear 20, a bush 30, a pair of wedges 40, a socket 50, a spring 50, a plate cover 70, and a guide ring 80.

The external gear 10 has a disk shape and has gear teeth formed on the inner peripheral surface thereof. The external gear 10 has a cylindrical central boss 11 formed in the center thereof.

The internal gear 20 has gear teeth formed on the outer peripheral surface of one end of the cylindrical member thereof. The internal gear 20 has a smaller diameter and the smaller number of gear teeth than the external gear 10. Accordingly, when the internal gear 20 is inserted into the external gear 10 and the gear teeth of both engage with each other, both gear teeth are engaged only in a partial section so that the external gear 10 is eccentric to the internal gear 20 (i.e. an eccentric space is defined between the external gear 10 and the internal gear 20 and components to be described later are installed in the eccentric space).

Accordingly, in a state in which one side of the external gear 10 is fixed to one side of the internal gear 20, when a rotational force is transmitted to the other sides of the external and internal gears 10 and 20, the other sides of the external and internal gears 10 and 20 rotate (revolve around and turn about) relative to the fixed sides thereof, with the consequence that the angle of a seat back is adjusted by double rotation.

In the embodiment of the present invention, the external gear 10 is fixed to an arm bracket of the seat back, and the internal gear 20 is fixed to a cushion bracket of a seat cushion. That is, the external and internal gears 10 and 20 are installed such that the internal gear 20 is fixed and the external gear 10 rotates relative thereto. However, the installation of the external or internal gear 10 or 20 to either of the seat back and the seat cushion may be changed depending on the design.

The bush 30 is fitted and installed to the inner peripheral surface of the internal gear 20 to guide the rotation of the wedges 40 and the socket 50 and to provide a friction surface.

The wedges 40 and the socket 50 are inserted into and installed in the inner space of the bush 30 that is fitted to the inner peripheral surface of the internal gear 20.

The wedges 40 consist of a pair of first and second wedges 41 and 42. The first and second wedges 41 and 42 are components that are symmetrical to each other and each have an arc shape. The wedges 40 are installed between the outer peripheral surface of the central boss 11 of the external gear 10 and the inner peripheral surface of the bush 30. That is, the outer peripheral surface of the central boss 11 of the external gear 10 is used as an inner friction surface and the inner peripheral surface of the bush 30 is used as an outer friction surface.

The first and second wedges 41 and 42 are shaped such that each of their ends adjacent to each other has a large width and the width of each of them is gradually reduced from the end thereof toward the other end thereof. Accordingly, when both the wedges 41 and 42 move toward their ends with small widths, the wedges 41 and 42 are fitted between the central boss 11 of the external gear 10 and the bush 30 to perform a lock function of suppressing the rotation of the external gear 10 by wedging action.

In a state in which they are assembled, the first and second wedges 41 and 42 have spring grooves 41a and 42a formed on the adjacent surfaces thereof, respectively, wherein the ends of the spring 60 are inserted into and supported by the spring grooves 41a and 42a.

The socket 50 has a connection boss 52 that protrudes from a substantially disk-shaped back plate 51 thereof and that is inserted into the central boss 11 of the external gear 10. The connection boss 52 may be eccentric to the back plate 51.

Operating ends 53 are formed on the lower half portion of the surface of the back plate 51 on which the connection boss 52 is formed, and serve to push the wedges 40 when the recliner is operated.

A drive shaft hole 51a having a spline shape is formed in the back plate 51 of the socket 50. The drive shaft hole 51a is formed through the connection boss 52. A drive shaft, which is rotatably connected to an electric motor or a lever directly operated by a user's hand, is spline-coupled to the drive shaft hole 51a.

The spring 60 having a ring shape is disposed on the back surface of the back plate 51 of the socket 50 (i.e. on a surface opposite to the surface on which the connection boss 52 is formed). Both ends of the spring 60 are bent toward the socket 50, and are inserted into and latched by the spring grooves 41a and 42a of the respective first and second wedges 41 and 42. A force is applied to the first and second wedges 41 and 42 such that their upper ends always move apart from each other by the spring 60. Thus, the wedges 40 move toward their ends with small widths to perform wedging action.

As described above, all of the bush 30, the wedges 40, the socket 50, and the spring 60 are inserted and installed in the internal gear 20. After all of them are inserted into the internal gear 20, a circular plate cover 70, which has a through-hole formed in the center thereof, is fitted to the outside of the spring 60 and the circumference of the plate cover 70 is welded to the inner peripheral surface of the internal gear 20 by laser. As a result, the separation of the components from the internal gear 20 is prevented.

The guide ring 80 is fitted to the outside of the internal gear 20 and is welded to the circumference of the external gear 10 by laser, thereby preventing the separation of the internal gear 20 from the external gear 10. That is, the guide ring 80 prevents the axial separation of the internal gear 20 from the external gear 10.

As illustrated in FIG. 3, the first and second wedges 41 and 42 have a plurality of first latching protrusions 41b and 42b that are circumferentially arranged at regular intervals on their side surfaces (corresponding to the back plate 51 of the socket 50).

The accompanying drawing illustrates an example in which each of the wedges 41 and 42 has two first latching protrusions, one of which is formed on its end with a small width, and the other of which is formed on a portion circumferentially spaced apart from the end by a predetermined distance.

In response, the back plate 51 of the socket 50 has a plurality of second latching protrusions 51a protruding toward the wedges 40. The second latching protrusions 51a are formed at regular intervals on an upper half portion in which the operating ends 53 are not formed in the back plate 51 of the socket 50.

In a state in which they are assembled, the second latching protrusions 51a of the socket 50 are located between the first latching protrusions 41b and 42b of the wedges 41 and 42, and the gaps between the second latching protrusions 51a of the socket 50 and the first latching protrusions 41b and 42b of the wedges 41 and 42 have the same size in all of the first and second latching protrusions, which are face-to-face with each other, when the socket 50 rotates (clockwise or counterclockwise). Thus, when the socket 50 rotates, the second latching protrusions 51a of the socket 50 and the first latching protrusions 41b and 42b of the wedges 41 and 42 come into contact with each other in all positions at the same point in time.

Each of the first latching protrusions 41b and 42b of the wedges 41 and 42 has a fan shape while being flat at both sides thereof. Similarly, each of the second latching protrusions 51a of the socket 50 has a fan shape while being flat at both sides thereof. Thus, when the second latching protrusions 51a of the socket 50 come into contact with the first latching protrusions 41b and 42b of the wedges 41 and 42, their corresponding surfaces are accurately in face contact with each other.

A protruding portion 51b is formed on the center of the circumferential width of the central second latching protrusion 51a (located between the first wedge 41 and the second wedge 42) from among the second latching protrusions 51a of the socket 50, and both sides of the protruding portion 51b are parallel to both sides of the central second latching protrusion 51a.

The protruding portion 51b is inserted into a space between the adjacent ends of both wedges 41 and 42 in a state in which they are assembled, and the protruding portion 51b comes into contact with the end of the associated one of the wedges 41 and 42 in a direction of rotation when the socket 50 rotates, to push the associated wedge.

The protruding portion 51b simultaneously comes into contact with the ends of the wedges 41 and 42 at the moment when the second latching protrusions 51a of the socket 50 come into contact with the first latching protrusions 41b and 42b of the wedges 41 and 42.

Meanwhile, the socket 50 is made of a plastic material by injection molding. The socket 50 is made of engineering plastic with excellent mechanical properties since it must have high strength and abrasion resistance in order to be used as a component of the recliner.

Hereinafter, the action and effect of the present invention will be described.

Figure 5:
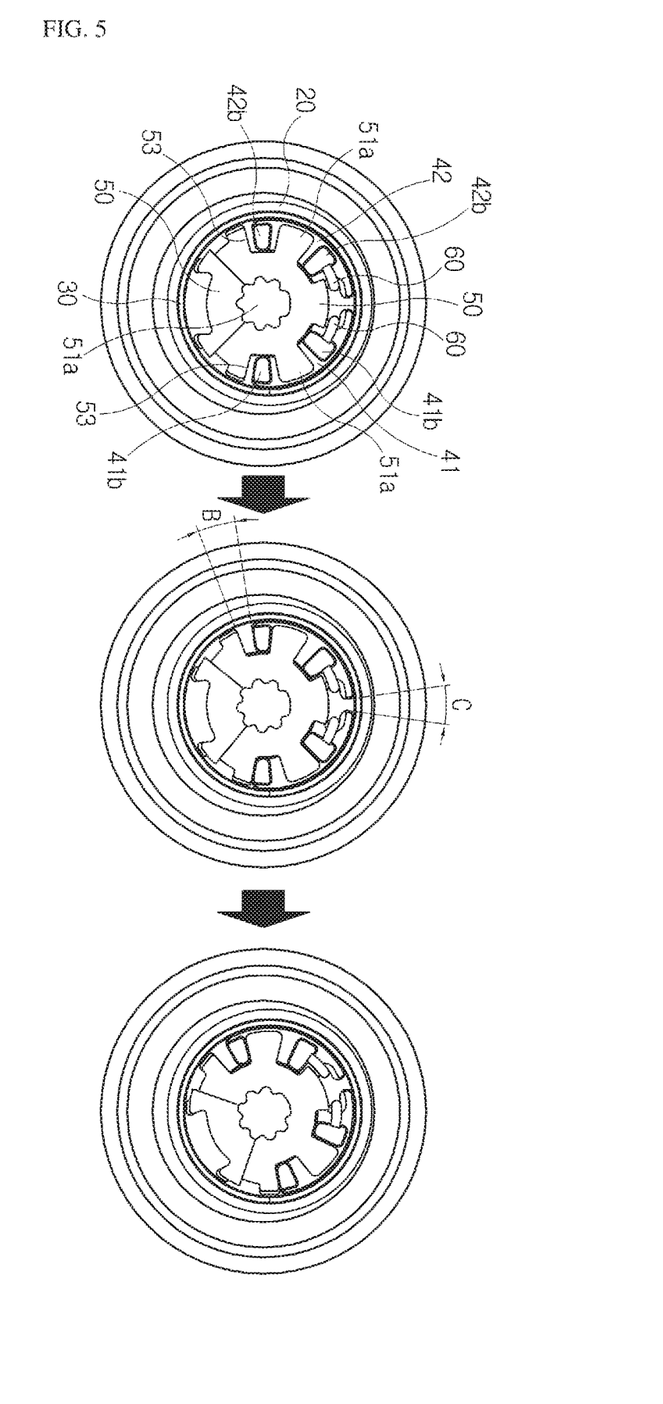
FIG. 5 is a view illustrating an operation sequence of the recliner according to the embodiment of the present invention.

The case where the socket 50 rotates counterclockwise will be described with reference to FIG. 5.

When the drive shaft, which is spline-coupled to the drive shaft hole 51a, rotates, the socket 50 rotates in the same direction as the drive shaft. All distances between the second latching protrusions 51a of the socket 50 and the first latching protrusions 41b and 42b of the wedges 41 and 42, which are face-to-face with each other in the direction of rotation of the socket 50, are the same. Therefore, the second latching protrusions 51a of the socket 50 simultaneously come into contact with the first latching protrusions 41b and 42b of the wedges 41 and 42. In this case, one operating end 53 of the socket 50 also simultaneously comes into contact with the end of the wedge 41 facing them in the direction of rotation thereof. That is, one of the operating ends 53 of the socket 50 comes into contact with the end of the corresponding one of the wedges 41 and 42 while the second latching protrusions 51a of the socket 50 come into contact with the first latching protrusions 41b and 42b of the wedges 41 and 42. In addition, the protruding portion 51b, which is inserted between the adjacent ends of both wedges 41 and 42, also rotates to come into contact with the end of the wedge (the second wedge 42 in FIG. 5) facing the protruding portion 51b in the direction of rotation thereof.

Accordingly, when the socket 50 rotates, at the same time, one of the operating ends 53 of the socket 50 comes into contact with the end (with a small width) of the corresponding wedge 41 or 42, the second latching protrusions 51a of the socket 50 come into contact with the corresponding first latching protrusions 41b and 42b of the wedges 41 and 42, and the protruding portion 51b of the socket 50 comes into contact with the end (with a large width) of the corresponding wedge 41 or 42. As a result, the first and second wedges 41 and 42 simultaneously rotate along with the socket 50.

Thus, since the first and second wedges 41 and 42 simultaneously rotate in a state in which the gap c between the first wedge 41 and the second wedge 42 is maintained, the clearance B between the opposite operating end 53 of the socket 50 to the direction of rotation thereof, and the end of the second wedge 42 corresponding to the same is reduced.

As described above, since a loss angle is reduced when the recliner is operated, the operational responsiveness of the recliner is improved.

In this case, the connection boss 52 of the socket 50 is inserted into the central boss 11 of the external gear 10, and the internal gear 20 is fixed. Therefore, the external gear 10 rotates (turns) in the same direction as the socket 50. Thus, the user may adjust the angle of the seat back in the same direction as that of rotation of the lever or motor.

Meanwhile, when a rotational force is applied to the external gear 10 (in the direction of rotation thereof) by the external force acting on the seat back after the adjustment of the angle of the seat back, the rotation of the central boss 11 of the external gear 10 is suppressed by the wedging action of one of two wedges in the direction of rotation, and thus the rotation of the external gear 10 is suppressed. Therefore, the seat back may be maintained in the state the angle thereof is adjusted.

On the contrary, since both the first and second wedges 41 and 42 rotate along with the socket 50 when adjusting the angle of the seat back, they may not perform wedging action. Therefore, the external gear 10 freely rotates, and thus the angle of the seat back may be adjusted.

Since the first and second wedges 41 and 42 directly act on the central boss 11 of the external gear 10 without a separate medium (a conventional cam sleeve 2), it is possible to reduce the number of parts so that the recliner has a simple structure and is reduced in weight.

In addition, since the socket 50 is made of a plastic material, its weight is significantly reduced. Thus, it is possible to significantly reduce the weight of the recliner.

As is apparent from the above description, in accordance with the present invention, first and second latching protrusions, which are latched to each other, are formed on the respective corresponding surfaces of two wedges and a socket, so that the wedges simultaneously rotate along with the socket. Accordingly, when a recliner is operated, the gap between the wedges does not act as a loss angle. Therefore, it is possible to improve the operational responsiveness of the recliner by a reduction in the size of the loss angle.

In addition, there is no need for an existing cam since the inner peripheral surfaces of the wedges come into direct contact with a central boss of an external gear. Therefore, the recliner can has a simple structure by a reduction in the number of parts.

Furthermore, since the socket is made of a plastic material to be reduced in weight, it is possible to reduce the weight of the recliner.

Although the present invention has been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. A recliner for a vehicle seat, comprising:
   an external gear having gear teeth formed on an inner peripheral surface thereof;
   an internal gear having gear teeth formed on an outer peripheral surface thereof, the internal gear being engaged with the external gear;
   an eccentric space defined by the internal gear and the external gear;
   a bush inserted into the eccentric space;
   a pair of wedges inserted into the eccentric space;
   a spring configured to push the pair of wedges in a direction in which the pair of wedges move apart from each other;
   a socket rotatably connected to a drive shaft to adjust an angle of a seat back by moving one of the wedges in a direction of rotation of the socket;
   a plate cover configured to prevent axial separation of the wedges, the spring and the socket; and
   a guide ring configured to prevent axial separation of the internal gear from the external gear,
   wherein the wedges have a plurality of first latching protrusions formed thereon, and the socket has a plurality of second latching protrusions latched to the first latching protrusions to rotate the wedges when the socket rotates, and
   wherein the plate cover is welded to an inner peripheral surface of the internal gear by laser.

2. The recliner according to claim 1, wherein when the socket rotates, one of an operating ends of the socket comes into contact with one of the pair of wedges while the second latching protrusions of the socket come into contact with the first latching protrusions of the pair of wedges.

3. The recliner according to claim 1, wherein the socket has a protruding portion inserted between the pair of wedges, and the second latching protrusions of the socket come into contact with the first latching protrusions of the wedges when the socket rotates while the protruding portion comes into contact with an end of an associated one of the wedges in the same direction of rotation to push the associated wedge.

4. The recliner according to claim 1, wherein:
   the external gear has a central boss protruding from its center, and the bush is fitted to the inner peripheral surface of the internal gear; and
   the pair of wedges performs wedging action in such a manner that an outer peripheral surface thereof is in contact with the bush and an inner peripheral surface thereof is in direct contact with the central boss of the external gear.

5. The recliner according to claim 1, wherein the socket is made of a plastic material.

6. The recliner according to claim 1, wherein the guide ring is welded to a side of the external gear by the laser.

* * * * *